March 15, 1927.  J. GOFFIN  1,620,644
METHOD OF HULLING GREEN PEAS
Filed Jan. 8, 1925  2 Sheets-Sheet 1
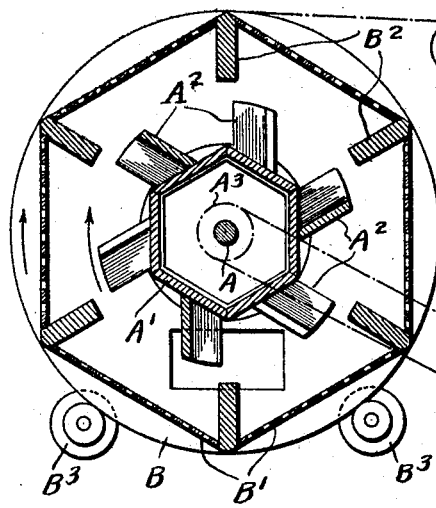
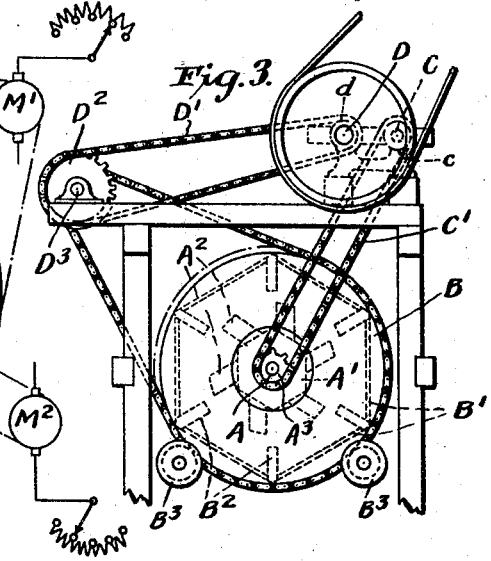
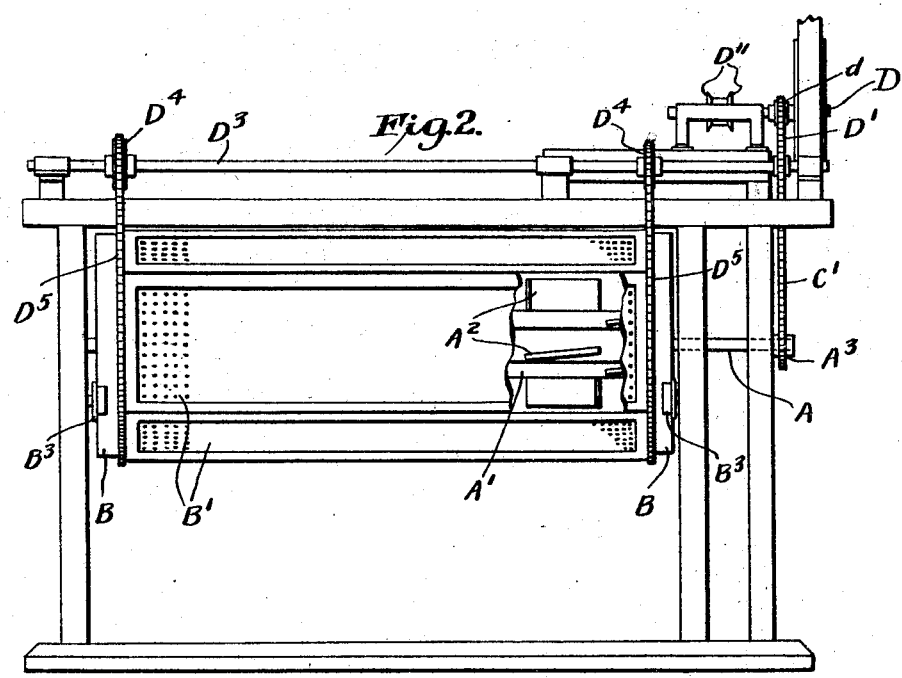
INVENTOR
John Goffin
BY
Gustav Bising
ATTORNEY March 15, 1927.  J. GOFFIN  1,620,644

METHOD OF HULLING GREEN PEAS

Filed Jan. 8, 1925    2 Sheets-Sheet 2

INVENTOR
John Goffin
BY
Gustav Bining
ATTORNEY

Patented Mar. 15, 1927.

1,620,644

UNITED STATES PATENT OFFICE.

JOHN GOFFIN, OF NIAGARA FALLS, NEW YORK, ASSIGNOR TO CHISHOLM-RYDER CO. INC., OF NIAGARA FALLS, NEW YORK, A CORPORATION OF NEW YORK.

METHOD OF HULLING GREEN PEAS.

Application filed January 8, 1925. Serial No. 1,205.

The object of my invention is to devise a new method of operating machines for hulling green peas while embedded in masses of vines to which they are attached, which machine was first described in the patent to Scott and Chisholm, No. 500,299, granted June 27th, 1893, and which has long been in extensive use in the various pea canning factories of the United States.

In that machine there is an outer, slowly revolvable drum with lifting ribs on the inside into which the pea vines are fed, the ribs acting to raise the vines inside the drum into its upper half, whence they drop from the ribs. While falling, though still in the upper half of the drum, and in free air, they are struck by more rapidly rotating beaters which are mounted on a rotating prismatic or other shaped support which turns inside the drum.

Now green peas are peculiar in this, that they are very tender and liable to bruise. In correct operation the beaters must always be given a speed so low as not to damage more of the tender peas than possible while they are being hulled by undergoing impact from beaters in free air. Yet, consistent with minimum bruising of the peas, the beater speed must be as high as is required to do the desired amount of hulling, for excessively low beater speeds will not hull the peas.

On the other hand, the drum has the function of raising the vines to an elevated position and to then let them drop into the path of the impacting beaters after which they fall to the bottom of the drum to be raised again, fall again and to be struck again. The drum speed whether low or high does not affect the bruising of the peas but it does affect the capacity of the apparatus to do more work on the vines, for the higher drum speeds produce a larger number of rotations in a given period and hence a larger number of impacts against the peas in a given time, because, with higher drum speeds, the peas are raised and fall into the path of the beaters a larger number of times in the given period and this, naturally, increases the number of green peas struck and therefore hulled in a given time. This is another way of saying that the increased drum speed increases the amount of work done by the machine which, in technical language, means that the capacity of the machine has been increased. The universal practice heretofore has been to reduce the drum speed whenever the beater speed was reduced.

My invention consists in a method of so varying the relative speeds of the lifting element, in this case the outer drum, and the beating element during the vining operation, that is, without the necessity of stopping the operation of the machine, that the lifting element may be driven at the velocity adapted to produce the desired high capacity and the beater may be independently driven at a speed adapted to produce a desired result in hulling instead as heretofore of determining the proper speed to get the best results from the standpoint of hulling and then let this beater speed control the drum or lifting speed.

In the drawings, Figure 1, represents a schematic diagram of a piece of apparatus upon which my method may be effected.

Figure 2, shows a side elevation, partly in section, of the more usual type of apparatus upon which my process will be executed.

Figure 3, shows an end elevation of the same piece of apparatus.

Figure 4:
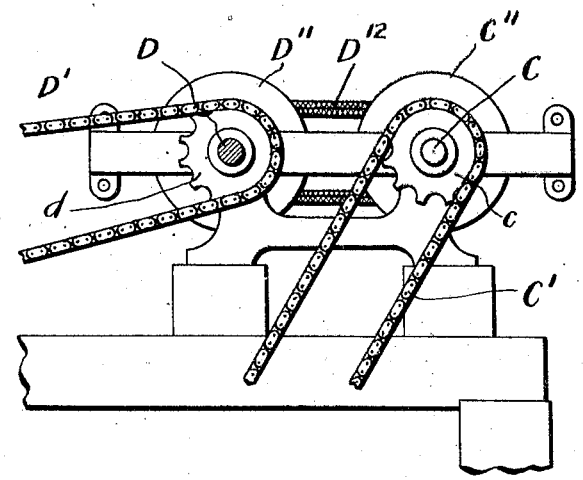
Figure 4, shows a detail of a variable speed device.

In the schematic representation of Figure 1, there is a central drive shaft A, upon which is mounted a prismatic support A', each face of the prism carrying beaters $A^2$, which are set on a slant so that every time a beater strikes a bunch of vines it will not merely hull some of the green peas thereto attached but will also throw the impacted vines from the feed end in the direction of the discharge end: all of which is so well understood in the art that it needs no further description. The apparatus just described may conveniently be referred to as the impacting element of the apparatus.

The lifting element of the apparatus consists of end rings B, which are connected by sieves B', there being lifting ribs $B^2$, at the corners of the prism, the whole being supported upon rollers $B^3$. As is well understood in the art, the green pea vines are lifted to the left, let us assume, until they reach a position which might be called the 11 o'clock position, whence they drop from the lifting ribs and fall into the path of the beaters A², which impact them, hull some of the peas, throw the bunch of vines across the top of the prism A', and let them fall to the bottom of the prism on the right hand side whence the lifting and dropping operations are repeated.

In the schematic illustration chosen, the outer drum is revolved by an electric motor M¹, of the type which gives constant speed under varying loads, and the inner prismatic beater-carrier is revolved by another motor M², of the same type, a sprocket chain in the first case running from the motor around the outside of the drum, and another sprocket chain running from the second motor around a sprocket A³, on the main drive shaft of the beater-carrying prism.

In my method of operating a green pea viner of this type, assuming green pea vines are fed thereinto, I determine the speed of the motor M¹, so as to produce the desired capacity for work, that is to say I determine the speed by adjusting the regulating mechanism of the motor so that the green pea vines within the drum will not be rotated fast enough to be held out against the inner surface of the drum by centrifugal force but at some speed below that maximum limit. This does not mean that I necessarily rotate the drum as fast as possible so long as the maximum speed just referred to is not reached. It does mean that I can rotate it fast enough to produce the greatest capacity desired and this irrespective of the speed of the beaters. The exact speed chosen will depend, to some extent, on the quality and density of the pea vines and upon the heaviness or lightness of the feed.

I thereupon proceed to rotate the motor M², which drives the main or power shaft of the beater-carrying prism, at a speed which is for correct operation determined solely by the joint consideration of hulling the most peas while damaging the fewest and irrespective of the speed of the outer drum. If the peas are unusually tender I must drive the beaters more slowly than if the peas are somewhat tougher. If it so happens that I must risk damaging a few more peas in order to hull a larger percentage of them, I will raise the beater speed. The main point in my method is that the speed of rotation is determined by the necessities which arise from the operation of the beaters on the peas and not those which have arisen, in times past, by some hard and fast connection in the relation of speeds between the lifting element and the impacting element.

Coming now to the second form of apparatus which I have shown upon which I may execute my process, it comprises a power shaft A, upon which is mounted a sprocket A³. There is a prismatic support A', upon which are mounted beaters A², in a manner which is old and common. These are the impacting elements. The lifting elements consists of rings B, carrying sieves B', between which are lifting ribs B², the rings being mounted upon rollers B³.

I now describe the method of driving this apparatus. There is a drive shaft D, carrying a sprocket wheel $d$, about which is wound a sprocket chain D', which goes around another sprocket wheel D², mounted on a shaft D³, which shaft carries two sprockets D⁴, around which take sprocket wheels D⁵, which sprocket wheels pass around the end rings B, of the lifting drum. I have here described how the power shaft conveys motion to the lifting drum.

I now proceed to describe how power is independently conveyed to the beater-carrying prism or impacting element. The shaft C, carrying a sprocket $c$, has a sprocket chain C', which passes around a sprocket A³, on the power shaft A, which turns the prismatic beater-carrier.

Figure 5:
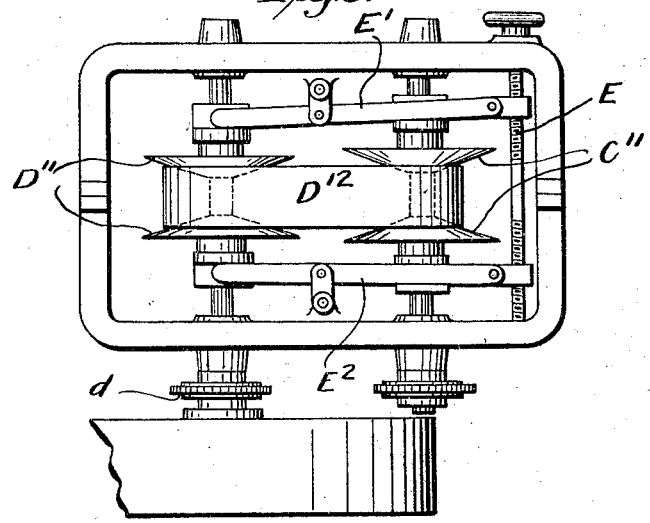
Figure 5, shows a plan of the same apparatus.

Now power is transferred from the power shaft D, to the shaft C, by a common speed changing device, which is clearly shown in Figure 5. The pair of pulleys D¹¹, are axially separable and the same is true of the pair of pulleys C¹¹. This axial separation is produced by the double-threaded screw shaft E, bearing on the links E¹, E², in such a way that when the pulleys D¹¹, are pushed together, thus causing them to contact with the belt D¹², at a point radially removed from the axis, the pulleys C¹¹, are pushed apart so that the belt D¹², contacts with the pulleys at a point nearer the axis, this operation causing the shaft C, to rotate more rapidly in relation to the shaft D.

It will be observed that in the construction of Figures 2, 3, 4 and 5, I have mounted the sprocket $d$, which immediately controls the speed of rotation of the lifting drum, directly upon the power shaft and this because the desirable changes in the speed of rotation of the lifting drum are not great. The connections from the main shaft of the canning factory can be so made as to give sufficiently approximate good results.

But, this drum or lifting speed having been fixed upon, I determine the speed of rotation of the beater element, which should vary greatly as between different wagon loads of green pea vines, by changing the ratio of speed rotations between the lifting element and the impacting element. This can be done immediately by an extremely skillful operator, who would know, offhand, exactly what is the best speed ratio for hulling purposes for the load of green pea vines and attached peas about to undergo hulling treatment. As a rule, however, for the usual operator, this proper speed ratio, which with a constant lifting speed in effect means the proper beater speed, will be reached by a cut and try method, by observing the hulled peas in the pea boxes, the amount of unhulled peas in the straw as it has been discharged from the vine and then changing the speed ratio, by moving the screw E without stopping the vining operation, until this beater speed and the results attained in hulling, are satisfactory.

I may say in conclusion that in tests which I have made in the field I have, without changing the number of damaged peas, increased the capacity of the machine by from 35 to 40%, thus making three machines do the work of four.

I claim:

1. The improvement in the method of vining green peas in which the vines are carried to an elevated position and subjected to impact in falling, which consists in lifting the vines at a definite rate measured in quantity of vines and, during the vining operation, varying the speed of movement of the impacting element according to the quality of the green peas to be acted upon and independently of the rate at which the vines are lifted.

2. The improvement in the method of vining green peas in which the vines are carried to an elevated position and subjected to impact in falling, which consists in determining the speed of movement of the lifting element adapted to lift the vines at a desired rate, maintaining the movement of the lifting element at such determined speed, and, during the vining operation, varying the speed of movement of the impacting element according to the quality of the green peas acted upon and independently of the rate at which the vines are lifted.

3. The improvement in the method of vining green peas in which the vines are carried to an elevated position by a rotary lifting element and subjected in falling to the action of a rotary impacting element, which consists in determining the speed of rotation of the lifting element adapted to lift the vines at a desired rate, maintaining the rotation of the lifting element at such determined speed, and, during the vining operation, varying the speed of rotation of the impacting element according to the quality of the green peas and independently of the rate at which the vines are lifted.

In testimony whereof, I have signed my name to this specification.

JOHN GOFFIN.